United States Patent [19]

Goracy

[11] Patent Number: 5,740,848

[45] Date of Patent: Apr. 21, 1998

[54] TIRE CHANGER TOOL SET

[76] Inventor: Grant Goracy, 13563 Cantlay St., Van Nuys, Calif. 91405

[21] Appl. No.: 559,058

[22] Filed: Nov. 16, 1995

[51] Int. Cl.⁶ ................................................. B60C 25/04
[52] U.S. Cl. ............................................. 157/1.3; 157/1.24
[58] Field of Search ........................... 157/1, 1.1, 1.11, 157/1.17, 1.2, 1.22, 1.24, 1.3

[56] References Cited

U.S. PATENT DOCUMENTS

| | | | |
|---|---|---|---|
| 1,741,801 | 12/1929 | White | 157/1.3 X |
| 2,655,985 | 10/1953 | Henderson | 157/1.24 |
| 3,139,137 | 6/1964 | Wiles | 157/1.1 |
| 3,191,657 | 6/1965 | Lund | 157/1.24 |
| 3,717,192 | 2/1973 | Hoover et al. | 157/1.3 X |
| 3,911,989 | 10/1975 | Vanderburg | 157/1.24 |
| 4,461,335 | 7/1984 | Beemer | 157/1.3 X |
| 4,738,294 | 4/1988 | Fosse | 157/130 X |

*Primary Examiner*—D. S. Meislin
*Attorney, Agent, or Firm*—John J. Posta, Jr.

[57] ABSTRACT

The improved tire changer tool set of the present invention includes a tire rim engager and a lever. The tire rim engager is in the form of a disc having a depending peripheral portion which may be a detachable ring and which is adapted to securely seat the engager in the rim of a tire. The tire rim engager also includes an upstanding generally central post having an expanded top which retains the lever in position around the post. The tire rim engager can have an annular recess on its bottom surface to receive the top portion of the detachable ring. Such ring can be held in place with screws through the disc and ring. Rims of different diameters can be installed on the disc. The lever is long and generally flat with two portions connected by a step so that when the lever is connected to the post by a side notch in the lever, one portion of the lever is raised and can act as a handle in rotating the lever around the post. One end of the lever has a chamfered or sloped portion which facilitates insertion of that end between the tire and rim to break the seal therebetween. The chamfered end can be removable from the lever end and the opposite end of the lever may include an upraised lip to facilitate forcing a tire during mounting up over the tire rim. The underside of the disc can be cut away to accommodate rims of different configurations. The post can have a vertical opening therethrough to accommodate motorcycle axle ends.

5 Claims, 2 Drawing Sheets

TIRE CHANGER TOOL SET

BACKGROUND OF THE INVENTION

1. Field of the Invention

The present invention generally relates to tools and more particularly to an improved tool set which is adapted for easier and faster changing of a tire to mount it on a wheel rim and demount it from the rim.

2. Prior Art

Removing or demounting a tire from a tire rim or wheel rim in order to substitute a new tire or in order to repair the tire and then remount it on the rim is a difficult task. In order to demount the tire it must be separated from the tire rim at the bead or seal on the periphery of the tire and rim and then the tire must be forced away from the rim. Mounting or remounting the tire involves the reverse technique of that just described. In either case, the worker is handling a heavy unwieldly rim and a tire which does not have much flexibility.

Various inventions have been conceived for helping to mount and demount tires. In some instances the devices used are stationary, massive and expensive. Certain circumstances, however, require the tire changing equipment to be portable. Under those conditions most workers rely on brute force and a simple tire iron which, although inefficient, is at least portable.

There remains a need for a simple, light weight, portable and efficient set of tools for mounting and demounting tires, such as those for cars, trucks, vans, motorcycles and the like, to and from wheel rims. Such tools should be capable of being used in small spaces and should provide optimum leverage and convenience at low cost.

SUMMARY OF THE INVENTION

The improved tire changer tool set of the present invention satisfies all the foregoing needs. The set is as set forth in the ABSTRACT OF THE DISCLOSURE.

Thus, the tool set is simple, inexpensive, efficient and portable. It is also durable and requires little effort to use. Furthermore, it has interchangeable parts so as to be able to fit tires and rims of various sizes and configurations.

The tool set comprises a tire rim (wheel rim) engager and a lever for engaging the tire rim engager and the tire and rim to efficiently separate the tire from the rim and force it away from the rim. The tire rim engager is in the form of a generally flat circular disc having a depending peripheral portion, which may be a plurality of legs or a permanent or detachable ring, and which is adapted to firmly seat the engager in the tire rim so that the disc is preferably held above the level of the tire rim. The disc also includes a generally central upstanding post which has a lever-retaining top of expanded size.

The post may be hollow to accommodate the end of a motorcycle axle or the like and the underside of the disc can be cut away to accommodate rims of various configurations. Preferably, rings of various diameters can be installed in an annular recess on the underside of the disc, as by screws, and extend therebelow to seat in tire rims of various diameters.

The lever preferably is elongated and flat, with two about equal portions connected end to end by an intermediate stop portion. A side notch is dimensioned so that the lever can be fitted around the post. When in that position, one portion of the lever is well about the level of the disc, facilitating rotating of the lever around the disc. One end of the lever is chamfered or sloped so to more easily pry apart the tire from the rim at the tire bead.

Once the chamfered end of the lever is slipped between the tire and rim, the lever can be connected to the post and then rotated to fully separate the tire and rim and force the tire over the rim. The opposite end of the lever can bear an upstanding rim or hook which can be used to move the tire into the proper position when mounting it on the rim or removing it from the rim. If desired, the chamfered end of the lever can be detachable so that ends with different chamfers can be used, as desired.

The tool set can be made of any durable material, steel, and is relatively small. It can be made in any suitable size and shape to fit the tire mounting needs. Further features of the improved tire changing tool set of the present invention are set forth in the following detailed description and accompanying drawings.

DRAWINGS

DETAILED DESCRIPTION

Figure 1:
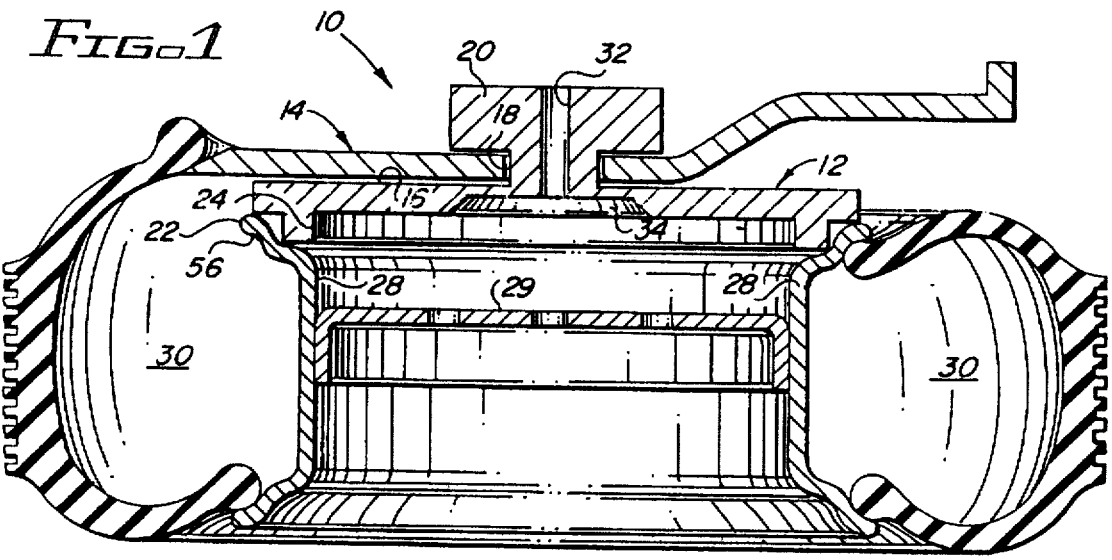
FIG. 1 is a schematic side elevation, partly in cross-section, of a first preferred embodiment of the rim engaging portion of the improved tire changer tool set of the present invention.
Figure 5:
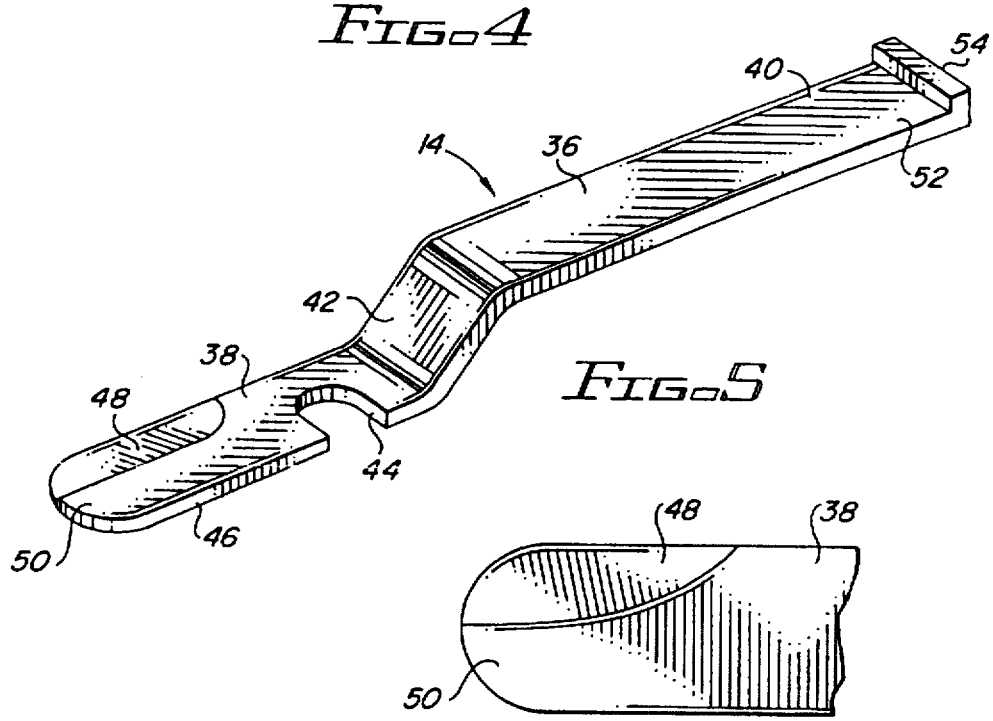
FIG. 5 is a schematic side perspective view of a first preferred embodiment of the lever tool of the improved tire changer tool set of the present invention.
Figure 6:
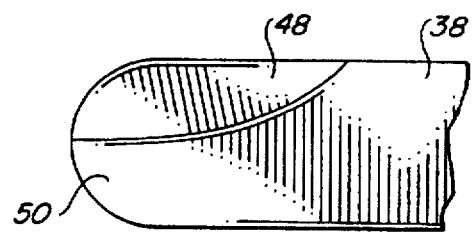
FIG. 6 is an enlarged fragmentary schematic top plan view of the chamfered end of the lever of FIG. 5.

FIGS. 1, 5 and 6.

A first preferred embodiment of the improved tire rim engager portion of the improved tire changer tool set of the present invention is schematically depicted in FIG. 1. A first preferred embodiment of the lever tool of the improved tire changer tool set is schematically depicted in FIGS. 5 and 6. Such tool is also shown in fragmentary form around the post of the tire rim engager of FIG. 1, constituting therewith a preferred embodiment of the tool set of the present invention.

Thus, in FIG. 1, improved tire changer tool set 10 is shown which comprises tire rim engager 12 and lever 14. Tire rim engager 12 comprises a generally flat preferably circular disc 16 having an upstanding generally central post 18 capped by an expanded lever-retaining top 20. Disc 16 has a generally peripheral depending rim 22 which may be integral with the underside of disc 16, as shown in FIG. 1. Rim 22 is dimensioned so as to snugly fit into the space 24 defined by the inner surface 26 of tire rim 28. Tire rim 28 is shown in FIG. 1 holding a tire 30 in place. Disc rim 22 holds disc 16 above or against the upper surface of tire rim 28.

Disc 16 is specially configured to receive in an opening 32 in post 18 the end of an axle, such as in a motorcycle, and moreover, the underside of disc 16 can be cut away to define a space 34 which accommodates specially configured tire rim components (not shown).

Lever 14 comprises an elongated flat strip 36 of durable metal such as steel, chrome steel, iron or the like having two approximately equal portions 38 and 40 connected end to end through an intermediate step portion 42 so that portion 40 is raised above the level of portion 38. This is provided so that when lever 14 is releasably connected to post 18, as through a curved notch 44 defined in side 46 of strip 36, portion 40 acts as a raised handle well above the level of the top surface of disc 16, enabling a worker to rotate lever 14 around post 18 without striking his or her hand against disc 16.

Preferably, lever 14 is also provided with a chamfered or downwardly sloped surface 48 on one side of end 50 of portion 38, as shown in FIGS. 5 and 6. This enables end 50 to be more easily wedged between the outer periphery of tire rim 28 and the adjoining beaded surface of tire 30. In addition, opposite end 52 of portion 40 may have an upturned rim 54 which can be used to force tire 30 up, over and away from tire rim 28 during demounting of tire 30 and for pulling tire 30 into position against rim 28 during mounting of tire 30.

When tire 30 is to be removed from tire rim 28, disc 16 is first placed on tire rim 28 in the position shown in FIG. 1. The seal between tire 30 and rim 28 on the top side of tire 30 then is broken at point 56 by first jamming end 50, particularly chamfered surface 48, down between tire 30 and rim 28 while lever 14 is generally vertical, and then moving lever 14 to a horizontal position while maintaining the described contact, and hooking it on post 18 through notch 44, after which lever 14 is rotated by handle portion 40 around post 18 to break the seal along the entire seal line. Either end 50 or end 52 with its rim or hook 54 can then be used to pull tire 30 over rim 28. The same procedure can be used on the opposite surface of tire 30 after removing disc 16, inverting tire 30 and reinserting disc 16 in rim 28, if the seal between tire 30 and rim 28 is not already broken.

Mounting tire 30 on rim 28 involves pulling tire 30 over rim 28 to the seal position through the use of rim or hook 54, with or without hooking of lever 14 to post 18 and rotating lever 14 therearound. End 50 of lever 14 can also be used to help maneuver tire 30 and rim 28 into their proper positions.

Set 10 enables a single worker to easily mount and demount a tire relative to a tire rim, using post 18 and lever 14 to provide the necessary mechanical force and smooth operation. Both lever 14 and engager 12 are relatively compact, light in weight, easy to use, durable, efficient and inexpensive. They can easily be carried in a vehicle and can be used whenever needed. Although metal is the material of choice for set 10, metal-ceramic composites known as cermets can also be used.

Figure 2:
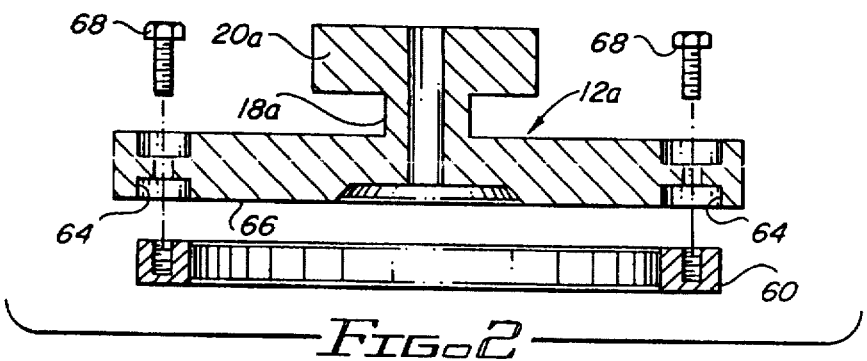
FIG. 2 is a schematic side elevation, partly broken away and partly in cross-section, of a second preferred embodiment of the rim engaging portion of the improved tire changer tool set of the present invention.
Figure 3:
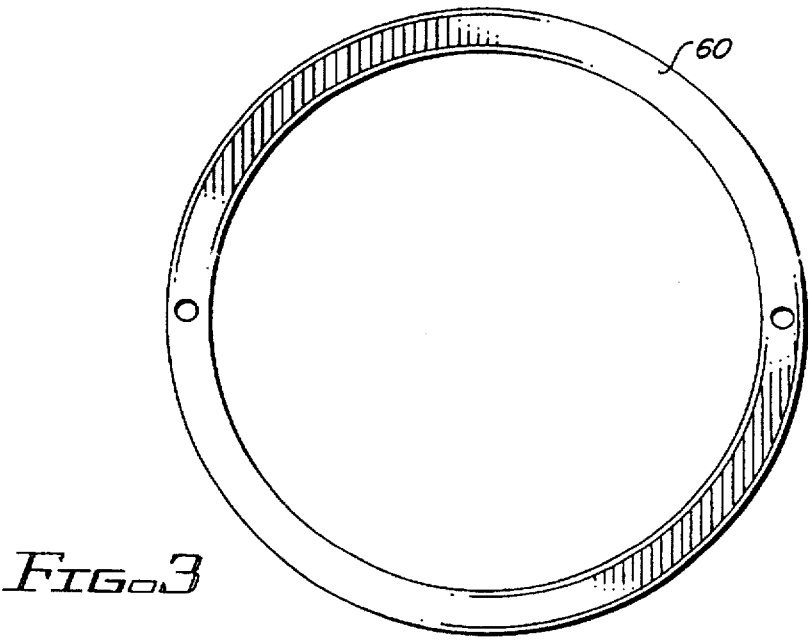
FIG. 3 is a schematic top plan view of the detachable ring of the improved rim-engaging portion shown in FIG. 2.
Figure 8:
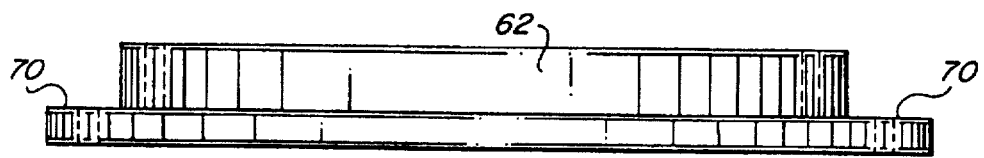

FIGS. 2, 3 and 8.

A second preferred embodiment of the tire rim engager used in the improved tool set of the present invention is schematically depicted in FIGS. 2, 3 and 8. Thus, engager 12a is shown. Components thereof similar to those of engager 12 bear the same numerals but are succeeded by the letter "a".

Engager 12a differs from engager 12 only as follows:

a) Instead of having an integral depending rim 26, disc 16a has at least one of the detachable rings 60 of FIG. 3 and 62 of FIG. 8. As shown in FIGS. 2 and 3, ring 60 is circular and the upper portion thereof releasably fits into a circular groove 64 in the underside 66 of disc 16a so that the lower portion of ring 60 extends below underside 66 to act as seating means for disc 16a in the space in a tire rim. Ring 60 is releasably held in place by spaced screws 68 passing down through disc 16a and into ring 60. Ring 60 can be substituted for by a similar ring 62 (FIG. 8) having an expanded peripheral portion 70 so that ring 62 fits the space in a wheel rim of a larger diameter than that which ring 60 fits. Thus, engager 12a can be adapted to snugly seat into wheel rims of different diameters.

b) Disc 16a does not have a cut-away lower central portion comparable to space 34.

Engager 12a has the other advantages of engager 12.

FIG. 4.

Figure 4:
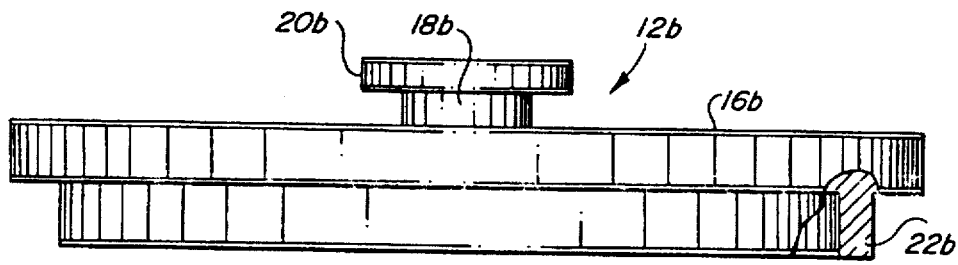
FIG. 4 is a schematic side elevation of a third preferred embodiment of the rim-engaging portion of the improved tire changer tool set of the present invention.

A third preferred embodiment of the engager portion of the tool set of the present invention is schematically depicted in FIG. 4. Thus engager 12b is shown. Components thereof similar to those of engager 12 bear the same numerals but are succeeded by the letter "b". Engager 12b is substantially identical to engager 12 except that engager 12b does not have a central opening through post 18b for the reception of the end of a wheel axle.

FIG. 7.

Figure 7:
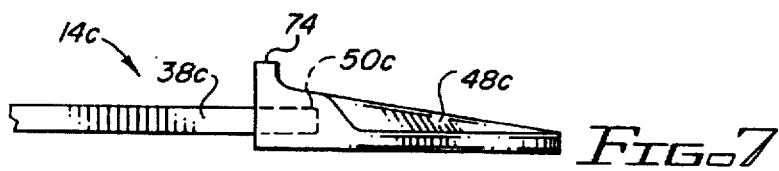
FIG. 7 is a fragmentary schematic side elevation of a second preferred embodiment of the lever tool of the improved tire changer tool set of the present invention; and, FIG. 8 is a schematic side elevation of an expanded diameter ring usable in the disc of FIG. 2.

A modified version of the chamfered end of the lever used in the tool set of the present invention is schematically depicted in FIG. 7. Thus, lever 14c is shown in fragmentary view. Components thereof similar to those of lever 14 bear the same numerals but are succeeded by the letter "c". Lever 14c is substantially identical to lever 14, except that end 50c is force fitted on portion 38c of lever 14c and is removable therefrom, if desired, so that another end 50c having a different chamfered portion 48c can be substituted. In addition, the rear end portion 40c has an upstanding detent ledge 74 to prevent end 50c from being inserted too far into the bead area space between a tire and the wheel rim on which it is mounted. Ledge 74 also acts as a pry fulcrum for the separation of tire and wheel rim at the bead line as previously described.

Further features of the present invention are as set forth in the foregoing. Various modifications, changes, alterations and additions can be made to the improved tire changer tool set of the present invention, its components and their parameters. All such modifications, chanes, alterations and additions as are within the scope of the appended claims form part of the present invention.

What is claimed is:

1. An improved tire changer tool set, said set comprising, in combination:

a) a tire rim engager, said rim engager comprising a generally horizontally extending disc having a peripheral depending portion adapted to engage the upper inside surface of a tire rim and seat said rim engager over said rim, said rim engager also including a generally central upstanding post having a tire lever-retaining upper portion, said rim engager disc defining a circular recess in the underside thereof, said depending portion comprising a ring releasably secured in said recess and depending therefrom; and, b) a generally longitudinally extending lever having opposite ends and sides, one of said sides defining a notch between said opposite ends, said notch being adapted to engage said rim engager post for rotation of said lever around said post, one of said lever ends having a chamfered edge for prying a tire from its rim.

2. The improved tire changer tool set of claim 1 wherein said ring is releasably secured in said recess by screws extending through said disc into said ring.

3. The improved tire changer tool set of claim 1 wherein said post has a circular expanded top to releasably hold said lever in place against said post.

4. The improved tire changer tool set of claim 3 wherein said disc below said post has a cut-away portion to accommodate specially configured tire rims.

5. The improved tire changer tool set of claim 4 wherein said disc and lever comprise steel.

* * * * *